United States Patent [19]

Schnizlein et al.

[11] Patent Number: 5,943,373
[45] Date of Patent: *Aug. 24, 1999

[54] EXTERNAL PROTOCOL HOOKS SYSTEM AND METHOD

[75] Inventors: Paul Schnizlein; Alan Hendrickson, both of Austin, Tex.

[73] Assignee: Advanced Micro Devices, Inc., Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/581,361

[22] Filed: Dec. 29, 1995

[51] Int. Cl.⁶ ........................................................ H04L 7/00
[52] U.S. Cl. ................................................................ 375/354
[58] Field of Search ..................... 375/259, 354, 375/356, 360; 370/438, 439; 455/465

[56] References Cited

U.S. PATENT DOCUMENTS

| | | | |
|---|---|---|---|
| 3,972,019 | 7/1976 | Bassett | 367/77 |
| 4,031,330 | 6/1977 | Van Leeuwen | 375/368 |
| 4,063,244 | 12/1977 | Van De Kop | 375/356 |
| 4,286,177 | 8/1981 | Hart et al. | 326/100 |
| 4,429,405 | 1/1984 | Bux et al. | 375/335 |
| 4,675,757 | 6/1987 | Block | 360/72.2 |
| 4,928,306 | 5/1990 | Biswas et al. | 379/201 |
| 5,384,807 | 1/1995 | Yatim et al. | 375/244 |
| 5,483,676 | 1/1996 | Mahany et al. | 455/76.4 |
| 5,587,573 | 12/1996 | Owen et al. | 235/280 |

*Primary Examiner*—Tesfaldet Bocure

[57] ABSTRACT

A method for enabling communications between a first communications unit and a second communications unit. The first communications unit has a first crystal that provides first unit timing for that unit. The second communications unit has a second crystal that provides second unit timing for the second communications unit. The method includes the steps of receiving the first unit timing by the second communications unit, detecting a transition of a cycle of the first unit timing received, generating a reset pulse upon each detection of the transition of the cycle of the first timing unit received, and initiating a start-up of a new sequence of the second unit timing upon occurrence of the reset pulse. Operation according to the method allows for a wide variety of external protocols to be used with appropriate communications results.

22 Claims, 6 Drawing Sheets

EXTERNAL PROTOCOL HOOKS SYSTEM AND METHOD

BACKGROUND OF THE INVENTION

The invention relates to electronic communications and, more particularly, to external protocol hooks for accomplishing communication between units in a digital communications system.

In electronic communications between units within a communications system, units are able to communicate each with the other because they follow particular protocols for communicating signals within the system. These protocols must provide for compatibility of communication operations between units in order to enable appropriate communications. In general, protocols for communications between units have been specific to the particular units and the particular electrical design of the units. Because of this specific nature of protocols for particular units, the prior designs for units have had only limited, if any, application versatility.

It has previously been particularly difficult for electronic communications designers to develop designs for communications units that may be employed in a variety of different applications. This has been the case, at least to some extent, because of the external protocols followed by communications units operating in accordance with the prior designs. System components of the prior communications units have typically been chosen according to the designs necessary for the communications units to operate according to system-specific external protocols. The particular external protocols followed within each system have, therefore, typically been system specific and, thus, suitable only for communications between units of the particular system for which the units are designed. It would be an improvement and advantage to provide electronic communications units capable of communicating via a variety of external protocols in systems and applications.

In regard to communications between electronic communications units, the term "hooks" is used to identify the particular means by which the units appropriately interface via external protocols to enable appropriate communications between units. Various external protocol hooks for accomplishing communications between units of a communications system have been employed in the past. An example of hook methodology for enabling communications between normally asynchronous units (i.e., each unit having its own independent internal clock) has been to make the timing of one unit, the slave, react in accordance with the timing of the other unit, the master.

Typically, the slave unit utilizes a phase lock loop and jitter integrator of the slave unit to slave that slave unit's timing to the timing of the master unit. The phase lock loop of the slave unit tracks the master unit's communication's signal timing frequency up and down, that is, by increasing and decreasing the frequency of the slave unit's clock signal, in order to seek to maintain a lock on those signals and their timing. The jitter integrator of the slave unit serves to adjust the frequency of the clock at the slave unit based on the operation of the phase lock loop to compensate for jitter. The jitter integrator may accomplish this adjustment, for example, by dictating a frequency divisor value used to create the slave clock, depending upon the adjustment in the slave unit timing necessary at any instant to maintain that timing as slave to the master unit timing.

Embodiments of the present invention provide a novel system and method of external protocol hooks, which system and method enable communications between units of an electronic communications system. In particular, the system and method provides an interface port that allows connection with a wide variety of communication protocols. Thus, the system and method are not system-specific and so have application to communications systems employing varied external protocols. The invention is, thus, a significant improvement and advance in the art and technology.

SUMMARY OF THE INVENTION

An embodiment of the invention is a method for enabling communications between a first communications unit and a second communications unit. The first communications unit has a first crystal that provides first unit timing and the second communications unit has a second crystal that provides second unit timing. The method comprises the steps of receiving the first unit timing by the second communications unit, detecting a transition of a cycle of the first unit timing received, generating a reset pulse upon each detection of the transition of the cycle of the first timing unit received, and initiating a start-up of a new sequence of the second unit timing upon occurrence of the reset pulse.

Another embodiment of the invention is an interface port. The interface port comprises an external transmit signal from the codec, an external receive signal to the codec, and an external clock signal to the codec. Either, but not both, of the external receive signal and the external clock signal may be communicating with the codec at any instant. In another aspect, the interface port further comprises a system synchronization circuit that receives the external clock signal and resets the codec based upon a characteristic of the external clock signal. The reset causes the codec to operate according to cycles of the external clock signal.

DESCRIPTION OF THE PREFERRED EMBODIMENTS

Figure 1:
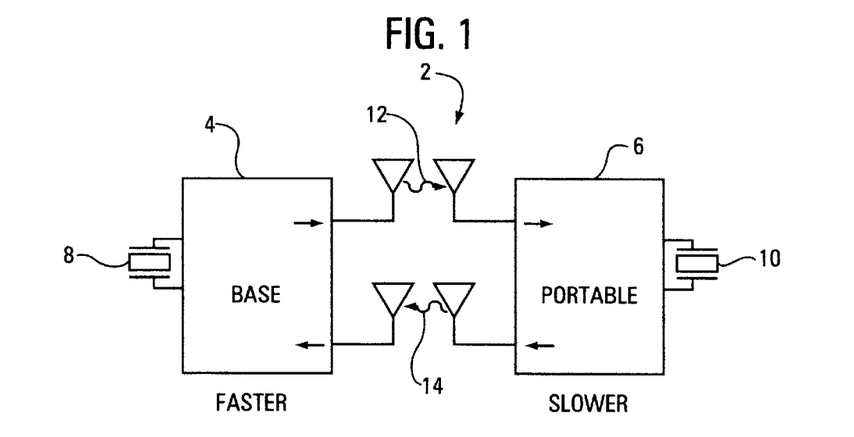
FIG. 1 is a simplified illustration of a digital cordless telephone which includes a base set unit and a handset unit, each unit having its own crystal.

Referring to FIG. 1, a digital cordless telephone 2 comprises a base set unit 4 and a portable (handset) unit 6. Each of the base set unit 4 and handset unit 6 has its own crystal 8, 10, respectively. The base unit crystal 8 and handset unit crystal 10 each serve to provide timing signals for the respective units 4, 6, according to the particular crystal 8, 10. Although similar crystals 8, 10 may be employed in the units 4, 6, there will, nonetheless, be certain non-identical characteristics of the crystals 8, 10 that will cause the timing of the units 4, 6 to be different. For example, if the base unit crystal 8 provides a faster frequency signal than the handset unit crystal 10, the base set unit 4 timing will be faster than the handset unit 6 timing. When the individual units 4, 6 operate independently, the timing differences between the crystals 8, 10 present no problem to operation of the units 4, 6. In contrast, when the units 4, 6 are communicating, some synchronization of the units 4, 6 must be achieved in order that communications be proper between the units 4, 6.

Communications between the units 4, 6 may be improper, for example, if the timing of one unit, either unit 4 or 6, lapses the timing of the other unit, unit 6 or 4, as applicable, so that a timing cycle is lost by one of the units 4, 6. Such a lost timing cycle can result in loss of significant data communicated between units 4, 6 and may affect operations of the units 4,6 and the system as a whole. The embodiments of the present invention overcome such problems and yet provide a system and method that may be employed with varied external protocols of communications systems.

Communications between the units 4, 6 are indicated by handset unit receive signal 12 and handset unit transmit signal 14. In the following discussion, the handset unit 6 is discussed for point of reference. It should be understood, however, that it is not necessary that the handset unit 6 timing be slaved to the base set unit 4 timing and that the reverse, and other variations, are possible. The reason that the handset unit 6 is considered the point of reference in the embodiments described in detail herein will be better understood as the discussion progresses. Variations and substitutions may be made in the embodiments, and all are included in the invention.

In the particular embodiments described herein, one of the units 6, the slave is operated as the slave of the other unit 4, the master. If, as in the particular embodiment described herein, the handset unit 6 is made the timing slave and the base set unit 4 the timing master, communications between units 4, 6 are made possible by the resulting timing synchronization of the units 4, 6 achieved according to the following description. That is, by causing one unit, the handset unit 6 in the following discussion, to be slave to the other unit, the base set unit 4 in the following discussion, appropriate communications may occur between the units 4, 6.

Figure 2:
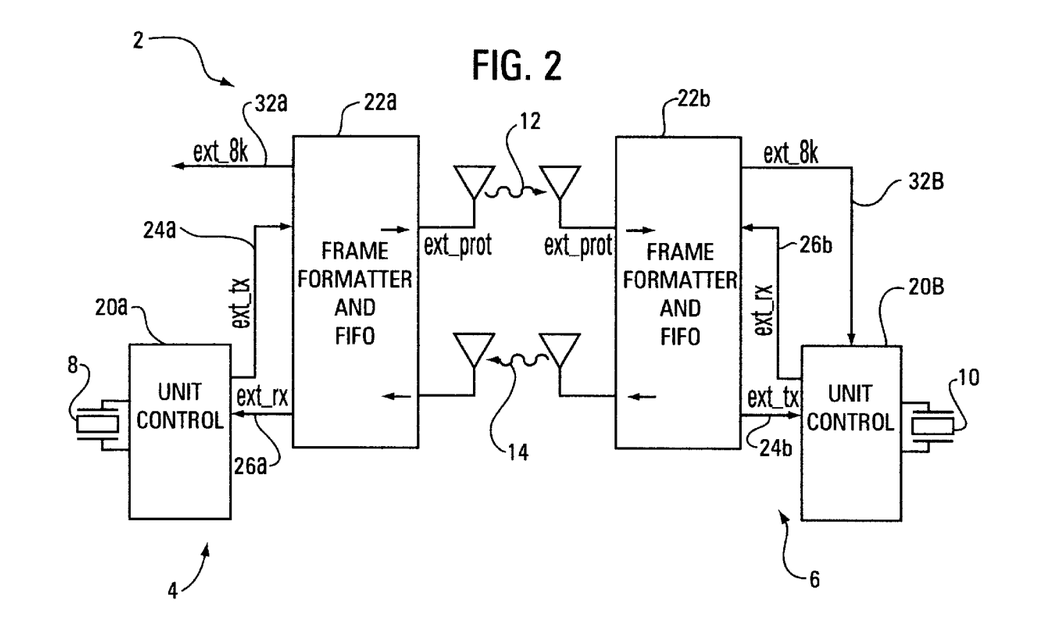
FIG. 2 is a more detailed, yet also simplified, illustration of the base set unit and handset unit of the digital cordless telephone of FIG. 1, showing a frame formatter/FIFO block and a unit control block of each of the base set unit and handset unit.

Referring to FIG. 2, a frame formatter and FIFO block 22a, 22b and a unit control block 20a, 20b of each unit 4, 6, respectively, are shown. As in FIG. 1, components of the base set unit 4 are shown on the left side of the Figure, and the components of the handset unit 6 are shown on the right side thereof. Of particular interest with respect to each units 4, 6 are the signals between the frame formatter/FIFO blocks 22a, 22b and the unit control blocks 20a, 20b of each unit 4, 6, respectively.

Considering the handset unit 6, the unit control block 20b of the handset unit 6 includes three external protocol interfaces with the frame formatter/FIFO block 22b. Those interfaces are an external transmit signal 24b, an external receive signal 26b, and an external clock signal 32b. It is of note that similar interfaces may be found in the master unit, i.e., the base set unit 4 in the example herein. For example, an external transmit signal 24a and an external receive signal 26a interface between the frame formatter/FIFO block 22a and unit control block 20a of the base set unit 4. The base set unit 4 operating as the timing master may or may not generate an external clock signal 32a; however, in any event, the unit 4 does not include an external clock signal 32a interface between the frame formatter/FIFO block 22a and the unit control block 20a.

During operation of the units 4, 6, the external clock signal 32b of the handset unit 6 serves as the timing signal for the unit 6 for purposes of maintaining appropriate protocol signals, and thus appropriate communications, between the units 4, 6. In effect, those three interfaces, the external transmit signal 24b, the external receive signal 26b, and the external clock signal 32b, enable the handset unit 6 to "hook" the external protocol receive signal 12 that is received by the handset unit 6 from the base set unit 4. Once the handset unit 6 so hooks the external protocol receive signal 12 transmitted by the base set unit 4, the handset unit 6 utilizes the receive signal 12 timing to dictate communications timing operations of the handset unit 6.

The handset unit 6, as the slave, is able to act as a slave to timing of the handset unit 4 master in a unique manner. An external clock signal 32b is generated by the base set unit 4 and transmitted as part of the handset unit receive signal 12. The external clock signal 32b generated by the base set unit 4 has a ratio or multiple relationship to the actual timing of the base set unit 4, that base set unit 4 actual timing being dictated by the crystal 8 of the base set unit 4. A particular ratio or multiple may be necessary, for example, so that the external clock signal 32b appropriately interfaces with operations of the handset unit 6 for decoding received signals 12. The particular ratio or multiple, although it may provide more readily useable timing for the handset unit 6, is not of significant importance; rather, the use of some ratio or multiple of the actual timing of the base set unit 4, whatever that ratio or multiple may be, is significant. It is important because the unit control block 20b must be able to read the external clock signal 32b, and it can do so only if the signal 32b is of the necessary format when input to the unit control block 20b via the external clock signal 32b interface.

Figure 3:
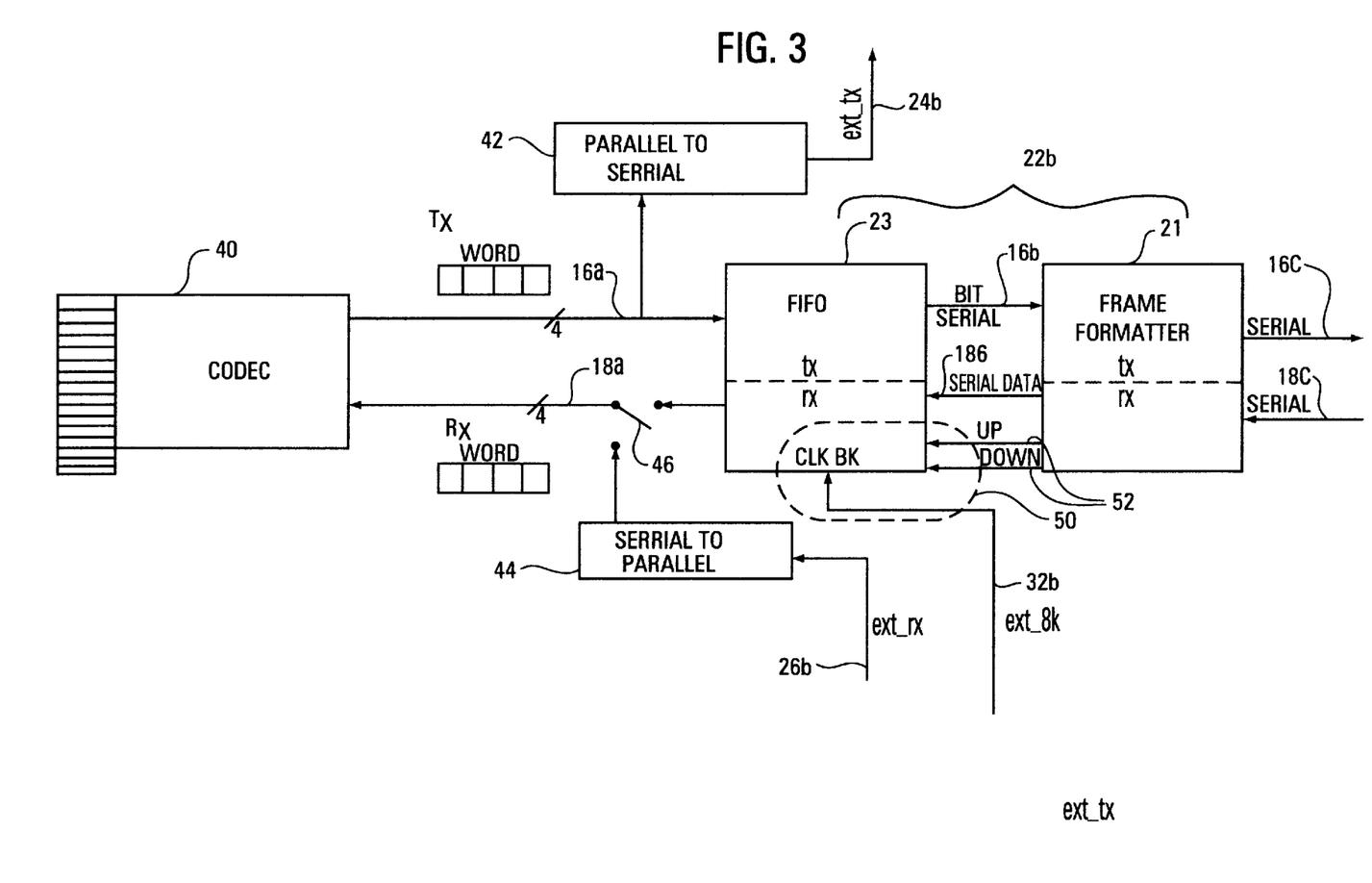
FIG. 3 is a simplified, block schematic of frame formatter, FIFO, and codec blocks of a base set unit or handset unit of the digital cordless telephone of FIG. 1.

Referring to FIG. 3, an example of an interface of the external clock signal 32b with operations of the handset unit 6 slave may be understood. As previously mentioned, an external receive signal 26b, an external transmit signal 24b, and an external clock signal 32b of the handset unit 6 form the external protocol interface. Particularly, the external clock signal 32b dictates timing of the handset unit 6 as slave to the base set unit 4 master. In prior devices, the external transmit signal 24b and the external receive signal 26b have been taken from signals passing between a frame formatter/FIFO block and a codec 40. If the external clock signal 32b is chosen in a manner that relates (i.e, as a ratio or multiple) to the operational cycle of the handset unit 6, the external clock signal 32b may be input within the frame formatter/FIFO block 22b and codec 40 configuration in a manner to achieve desired slave timing. In such a situation, the chosen ratio or multiple relationship of the external clock signal 32b to the actual timing of the base set unit 4 master may provide for desirable interface with operations of the handset unit 6 slave, such as that illustrated.

In the particular embodiment illustrated, that interface with operations of the handset unit 6 slave is achieved by input of the external clock signal 32b to a clock synchronizer circuit 50 of a FIFO 23 of the frame formatter/FIFO block 22b. The block 22b also includes a frame formatter 21. The clock synchronizer circuit 50 is later discussed in more detail with respect to FIG. 4. The frame formatter/FIFO block 22b and codec 40 configuration includes various signals passed between the frame formatter 21, the FIFO 23, and the codec 40. Transmit data 16a passes from the codec 40 to the FIFO 23, and a signal 16b passes from the FIFO 23b to the frame formatter 21, and thereafter a signal 16c passes from the frame formatter 21. On the receive side, a signal 18c is received by the frame formatter 21, then a signal 18b is passed from the frame formatter 21 to the FIFO 23, and it is thereafter passed on between the FIFO 23 and codec 40 as receive data 18a.

The external transmit signal 24b is the transmit data 16a signal after conversion to serial from parallel via the converter 42. The receive data 18a signal may pass to the codec 40 either from the FIFO 23 or from the serial to parallel converter 44. The converter 44 receives the external receive signal 26b when communications are received. The toggle between passage of serial data 18c, 18b, 18a to the codec 40 in connection with transmit communications and passage of external receive signal 26b when communications are being received by the unit 6 is illustrated as a switch 46 in FIG. 3. The frame formatter 21 also delivers to the FIFO 23 certain up and down signals 52 which serve as input to the clock synchronization circuit 50 in order to account, for example, for jitter on the received signals 12. The up and down signals 52 and their operation in connection with system synchronization are more particularly described in the related applications, previously listed.

Figure 4:
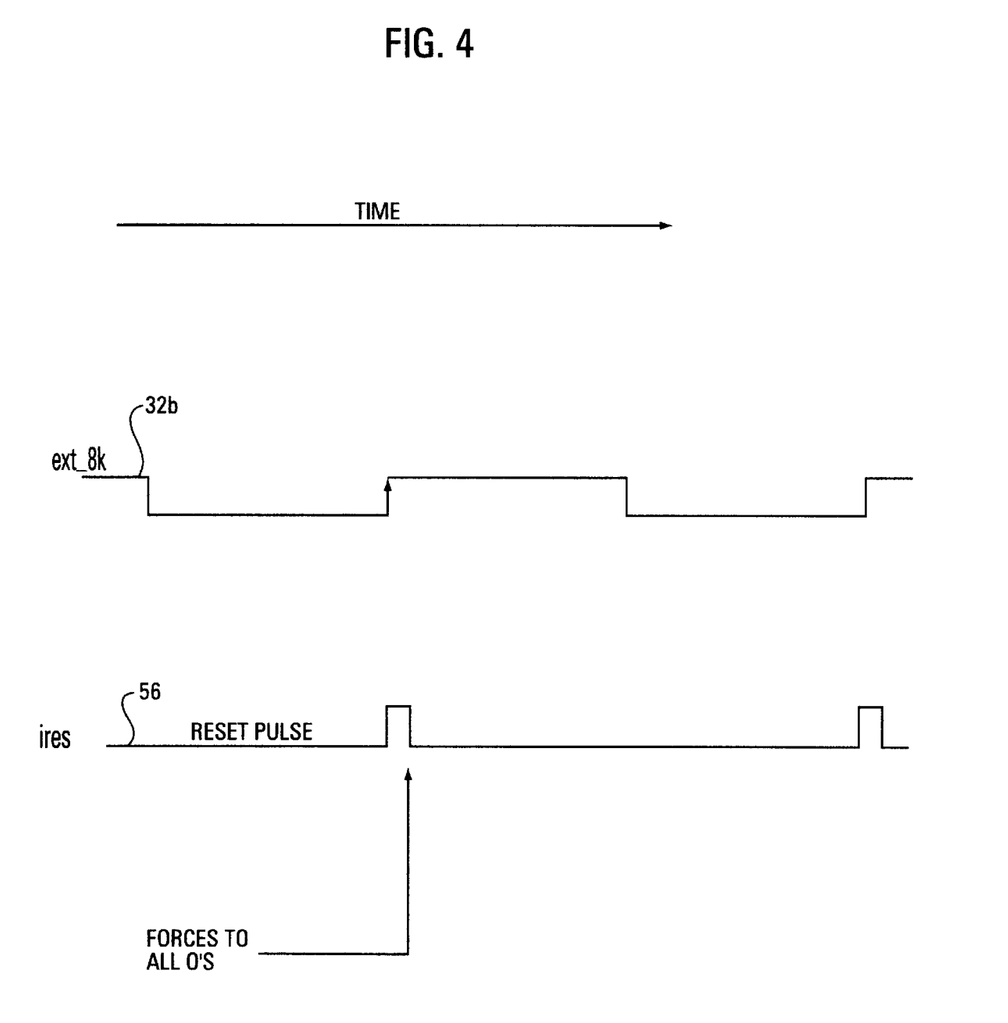
FIG. 4 is an illustration of a waveform of an external clock signal of a master unit and a reset pulse signal of a slave unit of an electronic communications system such as the digital cordless telephone of FIG. 1.

Now referring to FIG. 4, it may be understood how the handset unit 6 establishes itself as a slave to the base set unit 4 master. In particular, a reset pulse signal 56 is generated upon each rising edge (i.e., transition) of the external clock signal 32b. The reset pulse signal 56 serves to cause the handset unit 6 to force certain counters to zero, thereby causing the handset unit 6 timing to act as a slave to the timing of the master base set unit 4. The external clock signal 32b and reset pulse signal 56 over time are illustrated in FIG. 4.

Figure 5:
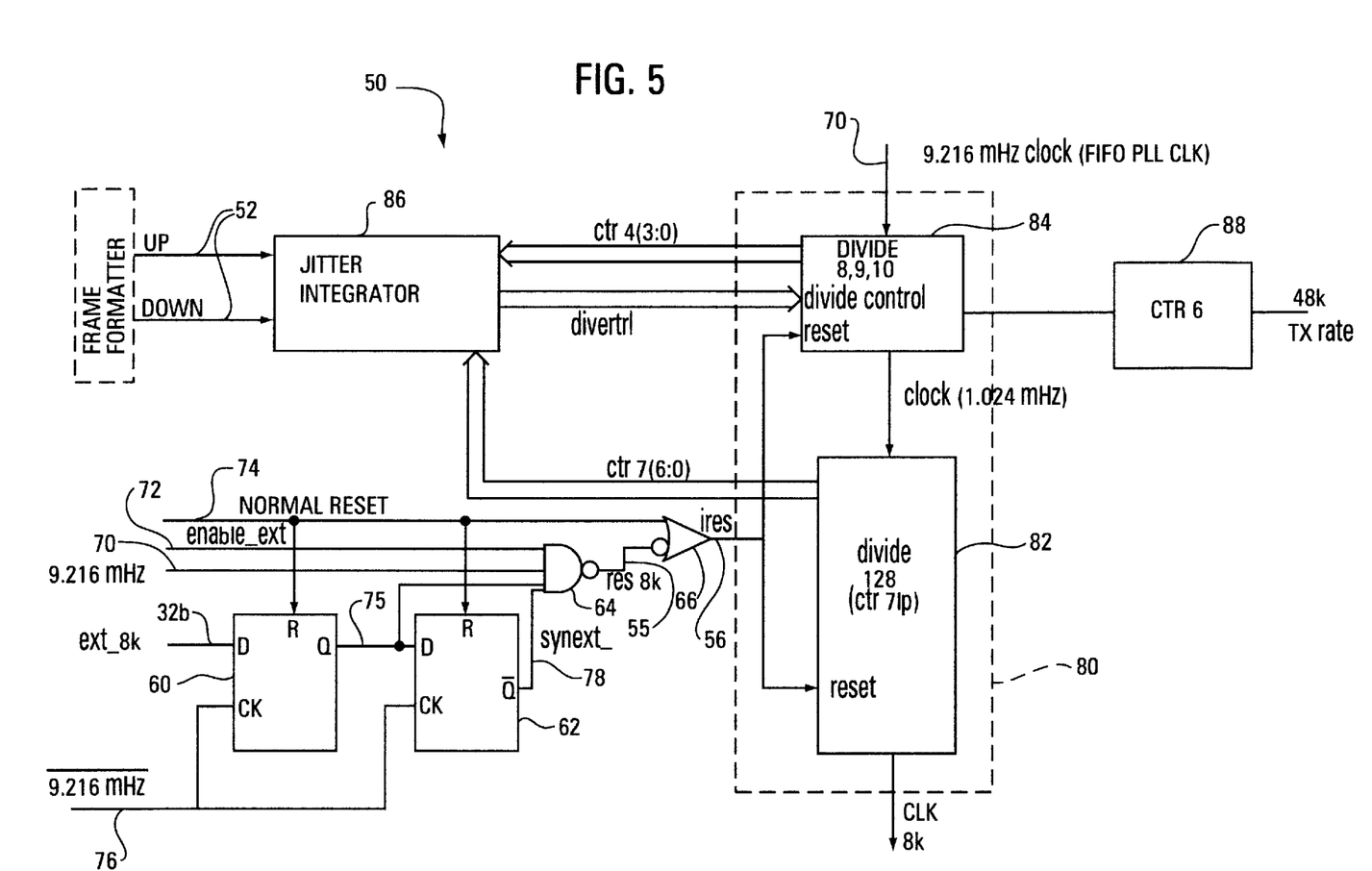
FIG. 5. is a simplified schematic illustration of functional blocks of a slave unit of an electronic communications system which operate to generate a reset pulse signal, such as that of FIG. 4, in order to make the slave unit timing the slave to the master unit timing.

Referring to FIG. 5, the relevance of the external clock signal 32b and the reset pulse signal 56 dependent on it can be understood as they each affect handset unit 6 timing so that the handset unit 6 is a slave to the base set unit 4. The external clock signal 32b is input to a first D-flip flop 60. A normal reset signal 74, which may, for example, be generated by the handset unit 6 as a general purpose reset for the unit 6, is also input to the first D-flip flop 60. The Q output signal 75 of the first D-flip flop is input to a second D-flip flop 62 and to NAND gate 64. The normal reset signal 74 is also input to the second D-flip flop 62. Other inputs common to the D-flip flops 60, 62 include an inverted clock signal 76 derived from a clock signal 70 generated based on the handset unit crystal 10.

Based on those inputs to the D-flip flops 60, 62, the second D-flip flop 62 outputs a synchronized external protocol signal 78 at its $\overline{Q}$ output. The synchronized external protocol signal 78 is input to a NAND gate 64. Other inputs to the NAND gate 64 are an enable external protocol signal 72 of the handset unit 6, a unit clock signal 70 derived from the handset unit crystal 10, and the Q output signal 75 which is the synchronized external clock signal 32b. The output of the NAND gate 64 is a reset signal 55. This reset signal 55 and the normal reset signal 74 are each input to a NOR gate 66. The output from the NOR gate 66 is the reset pulse signal 56.

In operation, the first and second D-flip flops 60, 62 and gates 64, 66 serve to latch the rising edge of the external clock signal 32b and provide the reset pulse signal 56. As previously mentioned, the reset pulse signal 56 serves to make the handset unit 6 a timing slave to the base set unit 4. This slave characteristic of the handset unit 6 is made possible by the reset pulse signal 56 because the signal 56 forces the values of certain counters 82, 88 to a known state, i.e., zero, each time the reset pulse signal 56 pulses. This serves to prevent loss of clock cycles within the handset unit 6 in comparison to the base set unit 4 timing because of the inconsistencies between the crystal 8, 10 based clock timing of the base set unit 4 and the handset unit 6. Over a number of counter cycles, drift of the crystal 8, 10 based clock timing of the respective units 4, 6 due to crystal 8, 10 inconsistencies could be significant and result in loss of timing cycles. Because the drift of the crystal 10 based clock timing of the handset unit 6 with respect to the crystal 8 based clock timing of the base set unit 4 is small over single or limited numbers of cycles of the counters 82, 88 between the occurrence of each reset pulse, however, clock cycles are not lost in embodiments of the invention. Rather than losing clock cycles in the handset unit 6, the up pulse of the reset pulse signal 56 maintains the handset unit 6 timing in conformity (that is, within limited range from conformity) with the base set unit 4 timing from the crystal 8. In this manner, the handset unit 6 timing is slaved to the base set unit 4 timing.

As to more details about the use of the external clock signal 32b at handset unit 6, the handset unit 6 in an embodiment of the invention includes a combination divider 80. The combination divider 80 may, for example, include a divide-by-128 block 82 and a divide-by-8, -9, -10 block 84. These blocks 84, 82 provide various timing signals for the handset unit 6 which are, in fact, derived as multiples or ratios of the unit clock signal 70 derived from the crystal 10 of the handset unit 6. The reset pulse signal 56, derived from the external clock signal 32b, as described above, sets counter values of counters related to the divider blocks 84, 82 each to zero. This, in effect, initiates new timing signal generation from the unit clock signal 70 upon the occurrence of each cycle of the external clock signal 32b. Because the external clock signal 32b is directly derived from the clock of the base unit crystal 8 of the base set unit 4, the generation of the reset pulse signal 56 within the handset unit 6 and the corresponding setting of each of the counter values of divider blocks 84, 82 to zero, initiates the start-up of a new clock sequence of crystal 10 derived timing of the handset unit 6 upon each pulse of the reset pulse signal 56. Thus, the handset unit 6, although it operates according to its own crystal 10 derived clock signal 70 during each time period between pulses of the reset pulse signal 56, achieves sufficient synchronization to the base set unit 4 for exchange of external protocols by forcing start-up of a new timing sequence based on the clock signal 70 upon each occurrence of a reset pulse signal 56 indicative of initiation of the external clock signal 32b slaved to the base set unit 4 actual timing.

Certain of the advantages of the embodiments of the present invention may now be understood. In particular, the resetting accomplished by the reset pulse signal 56 in order to synchronize the handset unit 6 and base set unit 4 as slave and master, respectively, provides for appropriate operation of the codec 40, notwithstanding the particular external protocols being employed for communications. Thus, the operations are independent of the particular external protocols in any instance, and this allows use of the embodiments with a variety of protocols in many different applications. Various external protocol blocks may, therefore, be hooked up to the codec 40 and all properly function.

Figure 6:
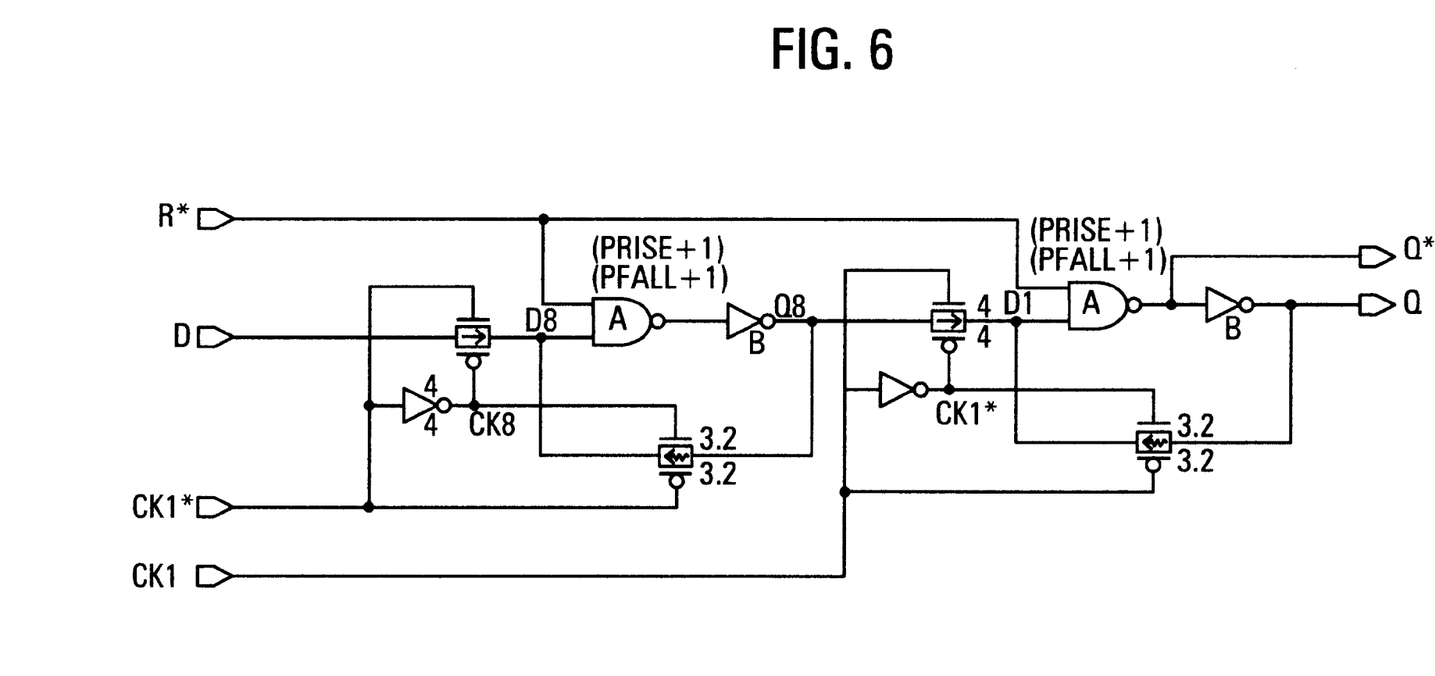
FIG. 6 is a schematic illustration of first and second D-flip flops of the slave unit of FIG. 5.

Now referring to FIG. 6, a detailed schematic of the first D-flip flop 60 and the second D-flip flop 62 of FIG. 5 is shown in detail. Those skilled in the art will understand and appreciate the details of the schematic.

Figure 7:
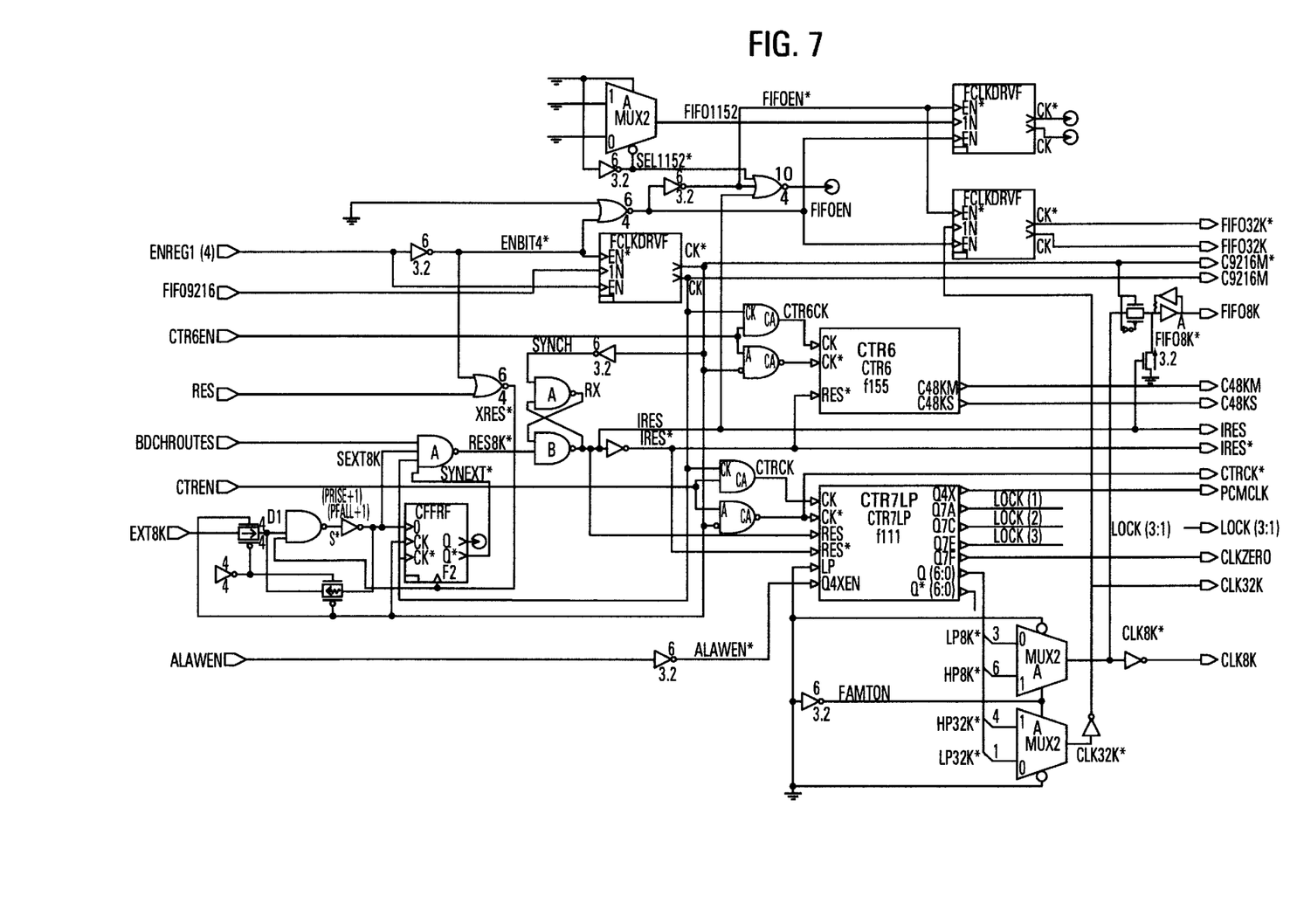
FIG. 7 is a detailed schematic of the slave unit functional blocks of FIG. 5, as well as certain other slave unit components.

Next referring to FIG. 7, a detailed schematic of portions of the handset unit 6 logic is shown. These portions include the features important to the external protocol hook system and method of the embodiments of the invention, as previously described. Those skilled in the art will also understand and appreciate the details and significance of the schematic in light of the overall disclosure.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed:

1. A method for enabling communications between a first communications unit and a second communications unit, the first communications unit having a first crystal that provides first unit timing and the second communications unit having a second crystal that provides second unit timing, comprising the steps of:

receiving the first unit timing by the second communications unit;

detecting a transition of a cycle of the first unit timing received;

compensating for jitter of the first unit timing received;

generating a reset pulse upon each detection of the transition of the cycle of the first unit timing received; and initiating a start-up of a new sequence of the second unit timing upon occurrence of the reset pulse.

2. The method of claim 1, further comprising setting a counter to a selected value in response to the reset pulse.

3. The method of claim 2, wherein the selected value is 0.

4. The method of claim 1, further comprising setting a plurality of counters to a selected value in response to the reset pulse.

5. The method of claim 4, wherein the selected value is 0.

6. The method of claim 1, further comprising generating timing signals derived from the first unit timing between reset pulses.

7. The method of claim 6, further comprising setting a counter to a selected value in response to the reset pulse.

8. The apparatus of claim 1, further comprising a plurality of counters arranged to receive the reset pulse and reset to a selected value in response to the reset pulse.

9. The apparatus of claim 8, wherein the selected value is 0.

10. The apparatus of claim 1, further comprising means for generating timing signals derived from the first unit timing between reset pulses.

11. The apparatus of claim 10, further comprising a counter arranged to receive the reset pulse and reset to a selected value in response to the reset pulse.

12. Apparatus for enabling communications between a first communications unit and a second communications unit, the first communications unit having a first crystal that provides first unit timing, and the second communications unit having a second crystal that provides second unit timing, the apparatus comprising:

means for receiving the first unit timing by the second communications unit;

means for detecting a transition of a cycle of the first unit timing received;

means for compensating for jitter of the first unit timing received;

means for generating a reset pulse upon each detection of the transition of the cycle of the first timing unit received; and means for initiating a start-up of a new sequence of the second unit timing upon occurrence of the reset pulse.

13. The apparatus of claim 12, further comprising a counter arranged to receive the reset pulse and reset to a selected value in response to the reset pulse.

14. The apparatus of claim 13, wherein the selected value is 0.

15. A method of enabling communications between a first communications unit having a first oscillator for generating a first timing signal and a second communications unit having a second oscillator for generating a second timing signal, the method comprising the steps of:

transmitting the first timing signal from the first communications unit to the second communications unit;

responsive to receipt by the second communications unit of the first timing signal, compensating for jitter of the first timing signal by the second communications unit;

generating a reset pulse upon each detection of a transition of a cycle of the first timing signal; and initiating a new sequence of the second timing signal upon each occurrence of the reset pulse.

16. The method of claim 15, further comprising setting a counter to a selected value in response to the reset pulse.

17. The method of claim 16, wherein the selected value is 0.

18. The method of claim 15, further comprising setting a plurality of counters to a selected value in response to the reset pulse.

19. The method of claim 18, wherein the selected value is 0.

20. The method of claim 15, further comprising generating timing signals derived from the first unit timing between reset pulses.

21. The method of claim 20, further comprising setting a counter to a selected value in response to the reset pulse.

22. Apparatus for enabling communications between a first communications unit having a first oscillator for generating a first timing signal and a second communications unit having a second oscillator for generating a second timing signal, the apparatus comprising:

means within the first communications unit for transmitting the first timing signal from the first communications unit to the second communications unit;

means within the second communications unit and responsive to receipt by the second communications unit of the first timing signal for compensating for jitter of the first timing signal by the second communications unit;

means within the second communications unit for generating a reset pulse upon each detection of a transition of a cycle of the first timing signal; and means within the second communications unit for initiating a new sequence of the second timing signal upon each occurrence of the reset pulse.

* * * * *